United States Patent
Hsu et al.

(10) Patent No.: US 11,705,934 B2
(45) Date of Patent: Jul. 18, 2023

(54) WIRELESS COMMUNICATION CHIP THAT MAKES BOTH 5 GHZ BAND AND 6 GHZ BAND SUPPORT TWO TRANSMIT AND TWO RECEIVE PATHS

(71) Applicant: Realtek Semiconductor Corp., HsinChu (TW)

(72) Inventors: Hao-Han Hsu, HsinChu (TW); Chung-Yao Chang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/534,435

(22) Filed: Nov. 23, 2021

(65) Prior Publication Data
US 2022/0337283 A1    Oct. 20, 2022

(30) Foreign Application Priority Data

Apr. 20, 2021    (TW) ................. 110114139

(51) Int. Cl.
*H04B 1/58*    (2006.01)
*H04B 1/44*    (2006.01)

(52) U.S. Cl.
CPC ............. *H04B 1/58* (2013.01); *H04B 1/44* (2013.01)

(58) Field of Classification Search
CPC . H04B 1/58; H04B 1/44; H04B 1/005; H04B 1/401
See application file for complete search history.

(56) References Cited

U.S. PATENT DOCUMENTS

| | | | |
|---|---|---|---|
| 9,019,898 B2 | 4/2015 | Damodaran | |
| 9,844,069 B2 | 12/2017 | Gao | |
| 2012/0108185 A1* | 5/2012 | Yen | H04B 1/0064 455/90.2 |
| 2013/0077540 A1* | 3/2013 | Black | H04B 1/109 370/277 |
| 2017/0358843 A1* | 12/2017 | Huang | H01Q 1/243 |
| 2019/0238167 A1* | 8/2019 | Tseng | H04W 88/06 |
| 2020/0287584 A1* | 9/2020 | Yoo | H04B 1/0064 |
| 2021/0306889 A1* | 9/2021 | Lee | H04B 1/44 |
| 2022/0271908 A1* | 8/2022 | Engala | H04B 1/44 |
| 2022/0353032 A1* | 11/2022 | Abdelghaffar | H04B 7/0689 |

FOREIGN PATENT DOCUMENTS

| | | |
|---|---|---|
| CN | 1720756 B | 6/2010 |
| CN | 111697979 A | 9/2020 |

\* cited by examiner

*Primary Examiner* — Nguyen T Vo
(74) *Attorney, Agent, or Firm* — Winston Hsu

(57) ABSTRACT

A wireless communication chip includes an analog front-end circuit and a baseband circuit. The analog front-end circuit includes a first transceiver circuit and a second transceiver circuit, wherein the first transceiver circuit is arranged to transmit or receive signals through a first antenna, and the second transceiver circuit is arranged to transmit or receive signals through a second antenna. The baseband circuit is arranged to control the first transceiver circuit to use a first band or a second band for communication, and/or to control the second transceiver circuit to use the first band or the second band for communication. The baseband circuit controls the first transceiver circuit and the second transceiver circuit so that the analog front-end circuit alternately performs 2T2R in the first band and 2T2R in the second band.

12 Claims, 9 Drawing Sheets

WIRELESS COMMUNICATION CHIP THAT MAKES BOTH 5 GHZ BAND AND 6 GHZ BAND SUPPORT TWO TRANSMIT AND TWO RECEIVE PATHS

BACKGROUND OF THE INVENTION

1. Field of the Invention

The present invention is related to a wireless communication chip, and more particularly, to a wireless communication chip that can make both 5 GHz band and 6 GHz band support two transmit and two receive paths (2T2R).

2. Description of the Prior Art

For a two transmit and two receive paths (2T2R) access point or a router that supports tri-band at the same time, a common feasible solution is to use system architecture of four chips. That is, the system architecture includes a core computing chip (e.g. central processing unit, CPU), a wireless communication chip of a 2.4 gigahertz (GHz) band, a wireless communication chip of a 5 GHz band, and a wireless communication chip of a 6 GHz band. Each wireless communication chip includes two antennas, and can independently perform data transmission and reception.

However, since the cost of designing and manufacturing four chips is too high, if the chips can be integrated, the cost can be reduced greatly. However, with the popularity of the sixth-generation Wi-Fi technology and Wi-Fi 6e technology, more and more stations have 2*2 antenna architecture to transmit and receive data from two spatial streams, to increase the transmitted and received data amount and shorten the data transmission time. As a result, how to design a single chip that can operate in two different bands at the same time and achieve 2T2R is an important issue.

SUMMARY OF THE INVENTION

It is therefore one of the objectives of the present invention to provide a wireless communication chip which can make both 5 GHz band and 6 GHz band support 2T2R, to address the problems in the prior art.

In an embodiment of the present invention, a wireless communication chip is provided. The wireless communication chip includes an analog front-end circuit and a baseband circuit. The analog front-end circuit includes a first transceiver circuit and a second transceiver circuit. The first transceiver circuit is arranged to transmit or receive signals through a first antenna, and the second transceiver circuit is arranged to transmit or receive signals through a second antenna. The baseband circuit is arranged to control the first transceiver circuit to use a first band or a second band for communication, and/or control the second transceiver circuit to use the first band or the second band for communication. The baseband circuit controls the first transceiver circuit and the second transceiver circuit so that the analog front-end circuit alternately performs 2T2R in the first band and 2T2R in the second band.

In another embodiment of the present invention, a wireless communication chip is provided. The wireless communication chip includes an analog front-end circuit and a baseband circuit. The analog front-end circuit includes a first transceiver circuit and a second transceiver circuit. The first transceiver circuit is arranged to transmit or receive signals through a first antenna, and the second transceiver circuit is arranged to transmit or receive signals through a second antenna. The baseband circuit is arranged to control the first transceiver circuit to use a first band or a second band for communication, and/or control the second transceiver circuit to use the first band or the second band for communication. The baseband circuit controls the first transceiver circuit and the second transceiver circuit so that the first transceiver circuit uses one transmit and one receive path (1T1R) in the first band, and the second transceiver circuit uses 1T1R in the second band. When the analog front-end circuit and the baseband circuit receive a specific packet that indicates a 2T2R requirement, the baseband circuit controls the first transceiver circuit and the second transceiver circuit so that the first transceiver circuit and the second transceiver circuit use 2T2R in the first band or the second band.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
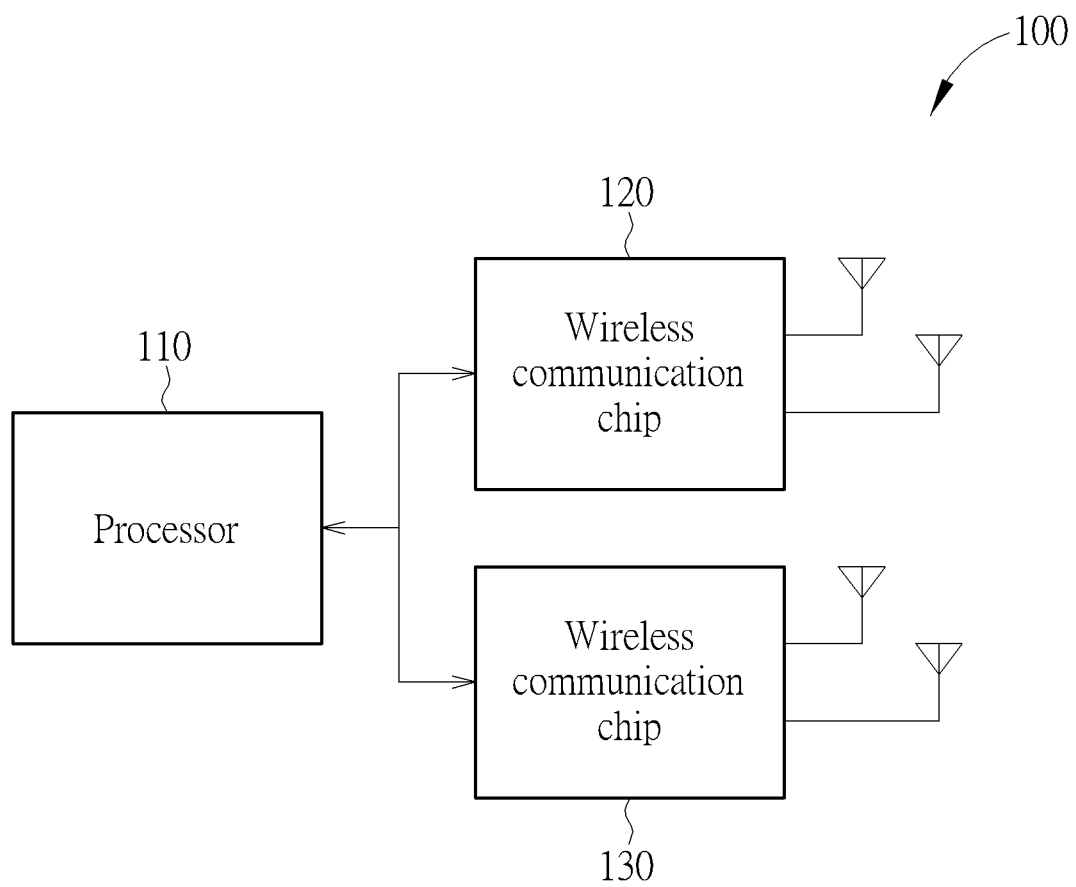
FIG. 1 is a diagram illustrating a chipset according to an embodiment of the present invention.

FIG. 1 is a diagram illustrating a chipset 100 according to an embodiment of the present invention, wherein the chipset 100 may be disposed in an access point or a router with 2T2R that supports tri-band at the same time. As shown in FIG. 1, the chipset 100 includes a processor 110 and two wireless communication chips 120, 130. The wireless communication chip 120 is a wireless communication chip supporting a 2.4 GHz band. That is, the wireless communication chip 120 may use channels in the frequency range of 2.412 GHz-2.484 GHz to transmit and receive signals. The wireless communication chip 130 is a wireless communication chip supporting the 5 GHz band and the 6 GHz band at the same time. That is, the wireless communication chip 130 may use channels in the frequency range of 4.915 GHz-5.825 GHz and 5.925 GHz-7.125 GHz to transmit and receive signals. In addition, each of the wireless communication chips 120, 130 is connected to at least two antennas for signal transmission and reception.

Figure 2:
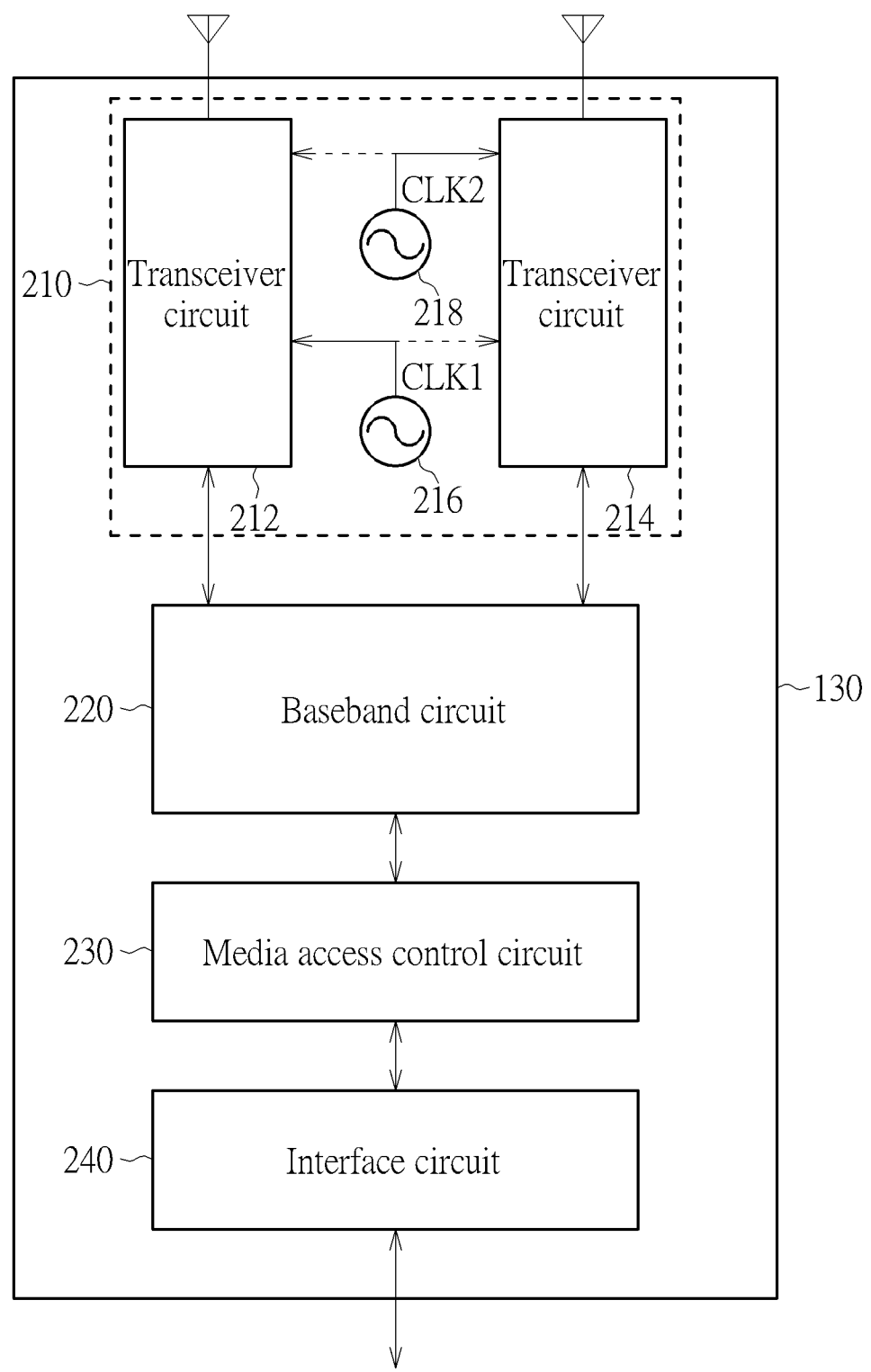
FIG. 2 is a diagram illustrating a wireless communication chip according to an embodiment of the present invention.

FIG. 2 is a diagram illustrating a wireless communication chip 130 according to an embodiment of the present invention. As shown in FIG. 2, the wireless communication chip 130 includes an analog front-end circuit 210, a baseband circuit 220, a media access control (MAC) circuit 230, and an interface circuit 240, wherein the analog front-end circuit 210 includes two transceiver circuits 212, 214 and two frequency synthesizers 216, 218. In the embodiment shown in FIG. 2, the transceiver circuit 212 is connected to an antenna, and can transmit and receive signals through the antenna. The transceiver circuit 214 is connected to another antenna, and can transmit and receive signals through the another antenna. Each of the transceiver circuits 212, 214 may include filter (s), mixer(s), amplifier(s), etc. Since the components and operations included in the transceiver circuits 212, 214 are well known to those with ordinary knowledge in the art, and the focus of this embodiment is on the frequencies of signals transmitted or received by the synthesizers 216, 218 and the transceiver circuits 212, 214. Therefore, the details of the related circuits of the transceiver circuits 212 and 214 will be omitted for brevity. The frequency synthesizer 216 is arranged to generate a clock signal CLK1 to a mixer in the frequency synthesizer 212, and the clock signal CLK1 may have different frequencies depending upon the currently used channel (e.g. a frequency of a channel being one of the channels in the 5 GHz band and the 6 GHz band). The frequency synthesizer 218 is arranged to generate a clock signal CLK2 to a mixer in the transceiver circuit 214, and the clock signal CLK2 may have different frequencies depending upon to the currently used channel (e.g. a frequency of a channel being one of the channels in the 5 GHz band and the 6 GHz band). In another embodiment, the clock signal CLK1 generated by the frequency synthesizer 216 may also be used by the mixer in the transceiver circuit 214, and/or the clock signal CLK2 generated by the frequency synthesizer 218 may also be used by the mixer in the transceiver circuit 212.

In addition, the baseband circuit 220 and the MAC circuit 230 are arranged to perform baseband signal processing and MAC related processing, respectively. The interface circuit 240 is connected to the processor 110 as an interface for data transmission between each other. In addition, since the frequency synthesizers 216, 218 of this embodiment may be operated in the 5 GHz band and the 6 GHz band to perform dual-band concurrent (DBCC), the baseband circuit 220 and the MAC circuit 230 include related circuits to cooperate with the function of enabling or disabling the DBCC. On the other hand, since other operations of the baseband circuit 220, the MAC circuit 230, and the interface circuit 240 are already well known to those with ordinary knowledge in the art, the relevant details will not be repeated.

On the other hand, the circuit architecture in the wireless communication chip 120 is similar to the architecture of the wireless communication chip 130 shown in FIG. 2. The only difference is that the circuit architecture in the wireless communication chip 120 may include only one frequency synthesizer used to generate a frequency of a channel in the 2.4 GHz band that is used by two transceiver circuits.

Figure 3:
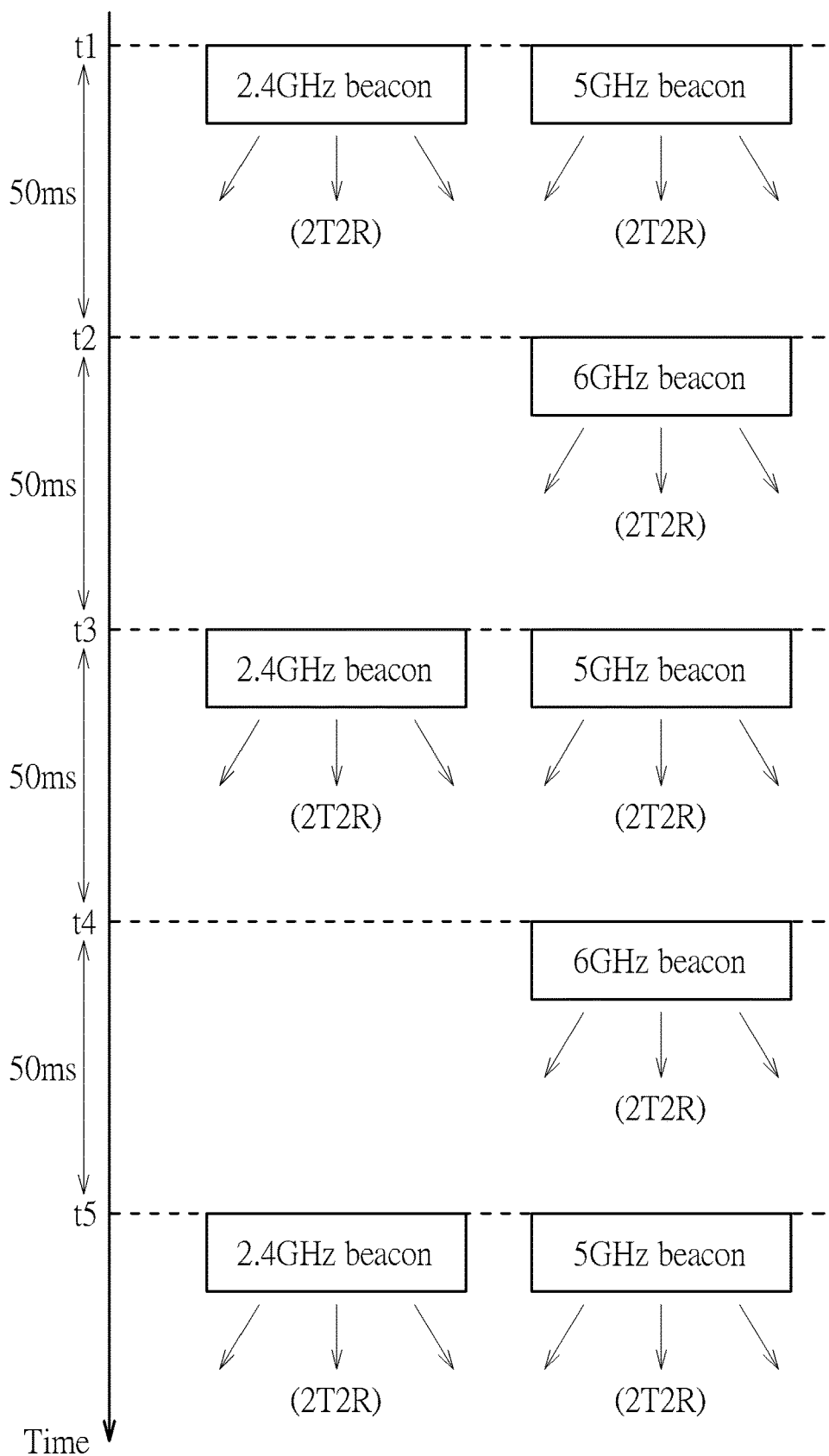
FIG. 3 is a diagram illustrating operations of a wireless communication chip according to an embodiment of the present invention.

In the operations of the chipset 100, to use three bands to communicate with stations, the wireless communication chip 130 in one embodiment uses time division multiple access (TDMA) technology to use different time slots to perform data transmission on signals of the 5 GHz band and the 6 GHz band, so that the single wireless communication chip 130 may support 2T2R on both of the 5 GHz band and the 6 GHz band. Specifically, please refer to the diagram illustrating operations of the wireless communication chips 120, 130 shown in FIG. 3. In FIG. 3, it is assumed that the chipset 100 needs to send a beacon every 100 milliseconds (ms) to notify the existence of the relevant channel. That is, if the chipset 100 needs to support three bands at the same time, it needs to send a 2.4 GHz band beacon, a 5 GHz band beacon, and a 6 GHz band beacon every 100 ms. At the time t1 shown in FIG. 3, the wireless communication chip 120 sends the 2.4 GHz band beacon, and may use 2T2R to communicate with one or more stations in the next time slot (t1-t3). Simultaneously, the wireless communication chip 130 sends the 5 GHz band beacon, and may use 2T2R to communicate with one or more stations in the next time slot (t1-t2). At the time t2, the wireless communication chip 130 sends the 6 GHz band beacon, and may use 2T2R to communicate with one or more stations in the next time slot (t2-t3). The wireless communication chip 120 does not need to send the 2.4 GHz band beacon at this time. At the time t3, the wireless communication chip 120 sends the 2.4 GHz band beacon, and may use 2T2R to communicate with one or more stations in the next time slot (t3-t5). Simultaneously, the wireless communication chip 130 sends the 5 GHz band beacon, and may use 2T2R to communicate with one or more stations in the next time slot (t3-t4). At the time t4, the wireless communication chip 130 sends the 6 GHz band beacon, and may use 2T2R to communicate with one or more stations in the next time slot (t4-t5). The wireless communication chip 120 does not need to send the 2.4 GHz band beacon at this time. At the time t5, the wireless communication chip 120 sends the 2.4 GHz band beacon, and may use 2T2R to communicate with one or more stations in the next time slot. Simultaneously, the wireless communication chip 130 sends the 5 GHz band beacon, and may use 2T2R to communicate with one or more stations in the next time slot (t5-t6).

In the embodiment shown in FIG. 3, by shortening the time slots of the wireless communication chip 130 to have the time length of each time slot in the wireless communication chip 130 being, for example, 50 ms which is half of the time length of each time slot in the wireless communication chip 130, the wireless communication chip 130 may switch bands every 50 ms, and the transmission intervals of the 5 GHz band beacon and the 6 GHz band beacon may also comply with the content of the specification. As a result, stations using the 5 GHz bands and stations using the 6 GHz bands may perform 2T2R in the corresponding time slots so that 2T2R on both of the 5 GHz band and the 6 GHz band may be supported under a condition of using a single wireless communication chip 130.

In addition, at the times t1, t3, t5 shown in FIG. 0.3, the frequency synthesizer 216 may generate the clock signal CLK1 corresponding to the 5 GHz band to the transceiver circuit 212, and the frequency synthesizer 218 may generate the clock signal CLK2 corresponding to the 5 GHz band to the transceiver circuit 214; or the frequency synthesizer 216 may generate the clock signal CLK1 corresponding to the 5 GHz band to the transceiver circuits 212, 214; or the frequency synthesizer 218 may generate the clock signal CLK2 corresponding to the 5 GHz band to the transceiver circuits 212, 214. In addition, at the times t2, t3 shown in FIG. 3, the frequency synthesizer 216 may generate the clock signal CLK1 corresponding to the 6 GHz band to the transceiver circuit 212, and the frequency synthesizer 218 may generate the clock signal CLK2 corresponding to the 6 GHz band to the transceiver circuit 214; or the frequency synthesizer 216 may generate the clock signal CLK1 corresponding to the 6 GHz band to the transceiver circuits 212, 214; or the frequency synthesizer 218 may generate the clock signal CLK2 corresponding to the 6 GHz band to the transceiver circuits 212, 214. These design changes should belong to the scope of the present invention.

In another embodiment of the present invention, the baseband circuit 220 and the MAC circuit 230 in the wireless communication chip 130 may enable the DBCC function in advance, and perform 1T1R for the 5 GHz band and the 6 GHz band. At this moment, the frequency synthesizer 216 may generate the clock signal CLK1 corresponding to the 5 GHz band to the transceiver circuit 212, and the frequency synthesizer 218 may generate the clock signal CLK2 corresponding to the 6 GHz band to the transceiver circuit 214. If the wireless communication chip 130 is connected to a station that needs to perform 2T2R and use two antennas to perform uplink data transmission, the baseband circuit 220 and the MAC circuit 230 will disable the DBCC function and perform fast band switching, so that the frequency synthesizers 216, 218 both generate the clock signals CLK1, CLK2 corresponding to the 5 GHz band to the transceiver circuits 212, 214, or the frequency synthesizers 216, 218 both generate the clock signals CLK1, CLK2 corresponding to the 6 GHz band to the transceiver circuits 212, 214. Specifically, refer to the diagram illustrating operations of the wireless communication chips 120, 130 shown in FIG. 4, wherein in FIG. 4, it is assumed that the chipset 100 needs to send a beacon every 100 ms to notify the existence of the relevant channel. At the time t1 shown in FIG. 4, the wireless communication chip 120 sends the 2.4 GHz band beacon, and may use 2T2R to communicate with one or more stations in the next time slot (t1-t2). Simultaneously, the wireless communication chip 130 enables the DBCC function and sends the 5 GHz band beacon and the 6 GHz band beacon, and may use 1T1R to communicate with one or more stations in the next time slot (t1-t2). At the time t2, the wireless communication chip 120 sends the 2.4 GHz band beacon, and may use 2T2R to communicate with one or more stations in the next time slot (t2-t3). Simultaneously, the wireless communication chip 130 sends the 5 GHz band beacon and the 6 GHz and beacon, and may use 1T1R to communicate with one or more stations in the next time slot (t2-t3). At the time t3, the wireless communication chip 130 receives a specific packet from a station, to notify that the station needs to use two antennas to perform the uplink data transmission in the 6 GHz band. The baseband circuit 220 and the MAC circuit 230 will disable the DBCC function and perform fast band switching, so that the frequency synthesizers 216, 218 both generate the clock signals CLK1, CLK2 corresponding to the 6 GHz band to the transceiver circuits 212, 214. That is, the wireless communication chip 120 sends the 2.4 GHz band beacon, and may use 2T2R to communicate with one or more stations in the next time slot (t3-t4). Simultaneously, the wireless communication chip 130 sends the 6 GHz band beacon, and may use 2T2R to communicate with one or more stations in the next time slot (t3-t4). At this moment, the wireless communication chip 130 is not able to use the 5 GHz band to communicate with other stations. At the time t4, if the data transmitted using 2T2R in the 6 GHz has been completely transmitted, the baseband circuit 220 and the MAC circuit 230 will enable the DBCC function again. That is, the frequency synthesizer 216 generates the clock signal CLK1 corresponding to the 5 GHz band to the transceiver circuit 212, and the frequency synthesizer 218 generates the clock signal CLK2 corresponding to the 6 GHz band to the transceiver circuit 214. At this moment, the wireless communication chip 120 sends the 2.4 GHz band beacon, and may use 2T2R to communicate with one or more stations in the next time slot. Simultaneously, the wireless communication chip 130 sends the 5 GHz band beacon and the 6 GHz band beacon, and may use 1T1R to communicate with one or more stations in the next time slot.

Figure 4:
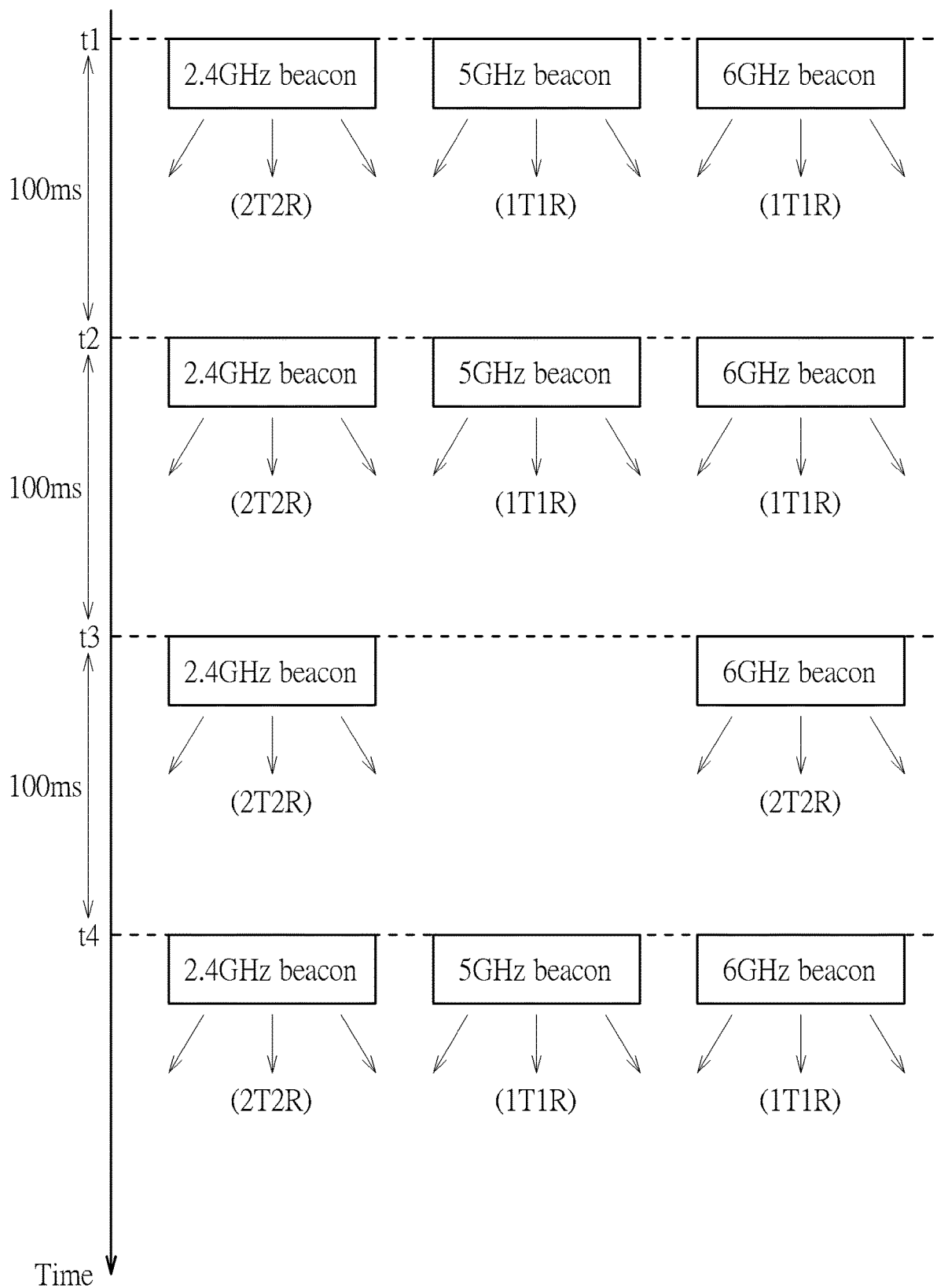
FIG. 4 is a diagram illustrating operations of a wireless communication chip according to another embodiment of the present invention.

In the embodiment shown in FIG. 4, the data of the 5 GHz band and data of the 6 GHz band are transmitted using 1T1R in the default state, to achieve the purpose of operating in three bands at the same time. When the station needs to use the 5 GHz band or the 6 GHz band to perform 2T2R, the fast band switching is performed to perform 2T2R. As a result, each of the station using the 5 GHz band and the station using the 6 GHz band may perform 1T1R or 2T2R according to the requirements, so that 2T2R on both of the 5 GHz band and the 6 GHz band may be supported under the situation of using a single wireless communication chip 130.

In the embodiment of FIG. 4, the aforementioned fast band switching at the time t3 needs to consider whether the 5 GHz band is in an idle state (i.e. no other stations are using the 5 GHz band to communicate with the chipset 100). If the 5 GHz band is in a busy state, the fast band switching cannot be executed at this moment, so that the wireless communication chip 130 is not able to use 2T2R in the 6 GHz band.

Figure 5:
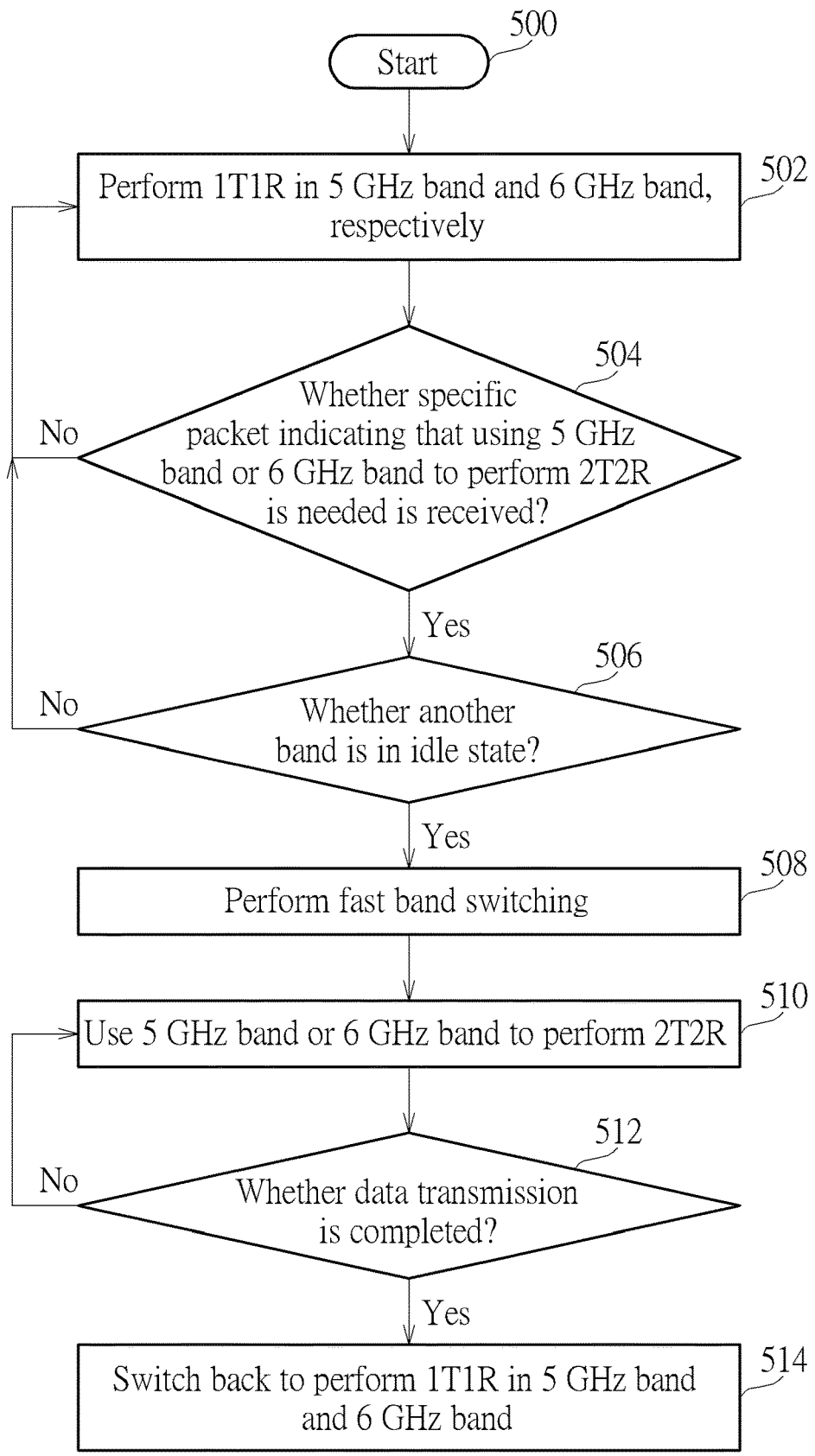
FIG. 5 is a flow chart of a wireless communication chip according an embodiment of the present invention.

FIG. 5 is a flow chart of operations of the wireless communication chip 130 according to an embodiment of the present invention. Referring to the contents provided in the embodiments of FIGS. 1, 2, and 4, the operation flow is as follows.

Step 500: The flow starts.

Step 502: The wireless communication chip performs 1T1R in the 5 GHz band and the 6 GHz band, respectively.

Step 504: It is determined that whether a specific packet is received, wherein the specific packet indicates that using the 5 GHz band or the 6 GHz band to perform 2T2R is needed. If yes, Step 506 is entered; if no, Step 502 is returned.

Step 506: It is determined that whether another band that does not need to perform 2T2R is in the idle state. If yes, Step 508 is entered; if no, Step 502 is returned.

Step 508: The fast band switching is performed.

Step 510: The 5 GHz band or the 6 GHz band is used to perform 2T2R.

Step 512: It is determined that whether the data transmission using 2T2R is completed. If yes, Step 514 is entered; if no, Step 510 is returned.

Step 514: The wireless communication chip switches back to perform 1T1R in the 5 GHz band and the 6 GHz band, respectively.

Figure 6:
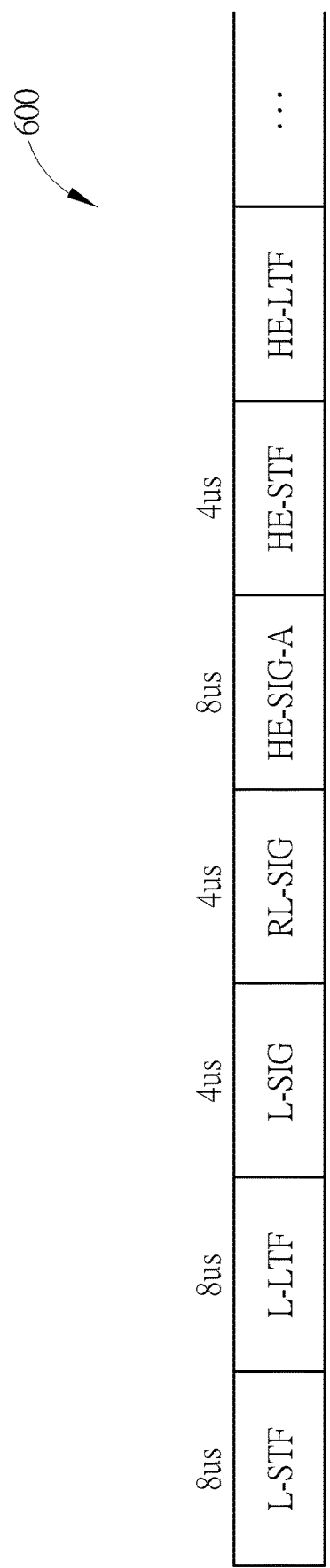
FIG. 6 is a diagram illustrating multiple fields included in a packet.

In the embodiments shown in FIGS. 4, 5, the wireless communication chip 130 may determine whether there is a station that needs to use two antennas to perform uplink data transmission according to the content of the received packet. Take FIG. 6 as an example of part of the content of a packet 600 for illustration, wherein the packet 600 is a high-efficiency single-user physical protocol data unit (HE SU PPDU). The packet 600 includes multiple fields, and the multiple fields in sequence are the L-STF field with a time length of 8 microseconds (us), the L-LTF field with a time length of 8 us, the L-SIG field with a time length of 4 us, the RL-SIG field with a time length of 4 us, the HE-SIG-A field with a time length of 8 us, the HE-STF field with a time length of 4 us, the HE-LTF field, etc. The content of each field of the packet 600 is specified in the related specification, and the details are not repeated here. In this embodiment, the baseband circuit 220 in the wireless communication chip 130 may determine whether the station that transmits the packet 600 needs to use the 5 GHz band or the 6 GHz band to perform 2T2R by parsing the content in the HE-SIG-A field, and may complete the fast band switching within the time range of the HE-STF field. In the process of fast band switching, the baseband circuit 220 first notifies the analog front-end circuit 210 to switch the frequency of the frequency synthesizer. For the embodiment of FIG. 4, the baseband circuit 220 will notify the frequency synthesizer 216 to switch the frequency of the clock signal CLK1 to the 6 GHz band. Then, the baseband circuit 220 measures the gain and frequency of the transceiver circuit 212, and performs automatic gain control, coarse/fine frequency adjustment, time synchronization, etc. Finally, the baseband circuit 220 updates related parameters according to the above operations, and starts to perform 2T2R.

In the embodiment of FIG. 3, the wireless communication chip 130 uses the TDMA method to achieve the purpose of supporting 2T2R on both of the 5 GHz band and the 6 GHz band. In the embodiments shown in FIGS. 4-5, the wireless communication chip 130 uses the fast band switching to provide 2T2R of the 5 GHz band or the 6 GHz band when needed. However, in another embodiment of the present invention, the above-mentioned TDMA and fast band switching may also be used in combination. Specifically, refer to the diagram illustrating operations of the wireless communication chips 120, 130 shown in FIG. 7, wherein in FIG. 7, it is assumed that the chipset 100 needs to send a beacon every 100 ms to notify the existence of the relevant channel. That is, if the chipset 100 needs to support three bands at the same time, it needs to send a 2.4 GHz band beacon, a 5 GHz band beacon, and a 6 GHz band beacon every 100 ms. At the time t1 shown in FIG. 7, the wireless communication chip 120 sends the 2.4 GHz band beacon, and may use 2T2R to communicate with one or more stations in the next time slot (t1-t3). Simultaneously, the wireless communication chip 130 enables the DBCC function and sends the 5 GHz band beacon and the 6 GHz band beacon, and may use 1T1R to communicate with one or more stations in the next time slot (t1-t2). At the time t2, the wireless communication chip 120 may keep performing 2T2R. The wireless communication chip 130 disables the DBCC function, and controls the frequency synthesizers 216, 218 to generate the clock signals CLK1, CLK2 of the 5 GHz band, to use 2T2R to communicate with one or more stations in the next time slot (t2-t3). At this moment, the wireless communication chip 130 is not able to use the 6 GHz band to communicate with other stations. At the time t3, the wireless communication chip 120 sends the 2.4 GHz band beacon, and may use 2T2R to communicate with one or more stations in the next time slot (t3-t5). Simultaneously, the wireless communication chip 130 enables the DBCC function and sends the 5 GHz band beacon and the 6 GHz band beacon, and may use 1T1R to communicate with one or more stations in the next time slot (t3-t4). At the time t4, the wireless communication chip 120 may keep performing 2T2R. The wireless communication chip 130 disables the DBCC function, and controls the frequency synthesizers 216, 218 to generate the clock signals CLK1, CLK2 of the 6 GHz band, to perform 2T2R to communicate with one or more stations in the next time slot (t4-t5). At this moment, the wireless communication chip 130 is not able to use the 5 GHz band to communicate with other stations.

Figure 7:
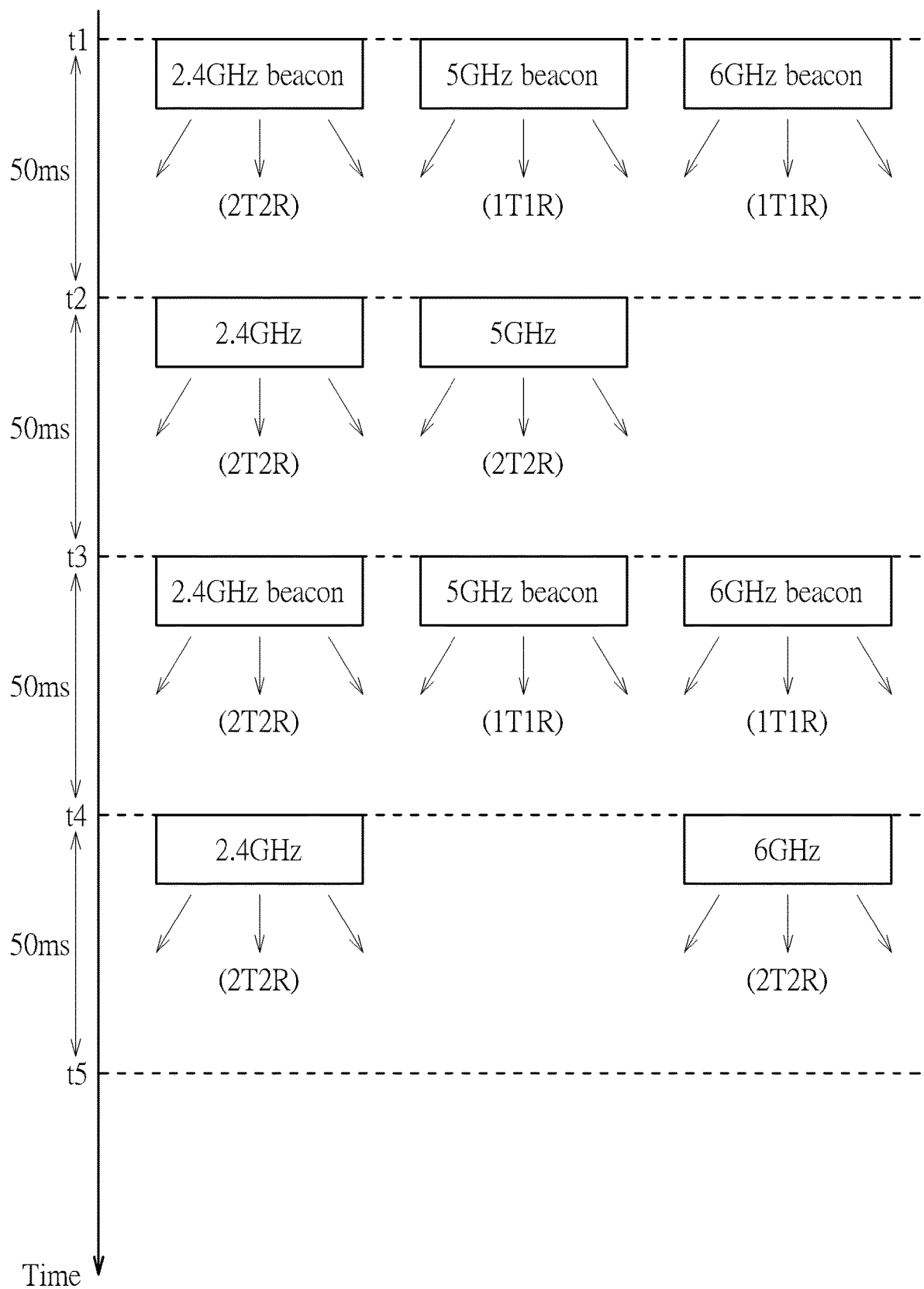
FIG. 7 is a diagram illustrating operations of a wireless communication chip according to another embodiment of the present invention.

In the embodiment shown in FIG. 7, at the times t1 and t3, the frequency synthesizer 216 may generate the clock signal CLK1 corresponding to the 5 GHz band to the transceiver circuit 212, and the frequency synthesizer 218 may generate the clock signal CLK2 corresponding to the 6 GHz band to the transceiver circuit 214. At the time t2, the frequency synthesizer 216 may keep generating the clock signal CLK1 corresponding to the 5 GHz band to the transceiver circuit 212, and the frequency synthesizer 218 needs band switching to generate the clock signal CLK2 corresponding to the 5 GHz band to the transceiver circuit 214. At the time t4, the frequency synthesizer 216 needs band switching to generate the clock signal CLK1 corresponding to the 6 GHz band to the transceiver circuit 212, and the frequency synthesizer 218 keeps generating the clock signal CLK2 corresponding to the 6 GHz band to the transceiver circuit 214.

It should be noted that, at the times t1 and t3, if the wireless communication chip 130 receives a specific packet from a station and is notified that the station needs to use two antennas to perform uplink data transmission in the 5 GHz band or the 6 GHz band, and another channel is just in the idle state, the baseband circuit 220 and the MAC circuit 230 may disable the DBCC function and perform the fast band switching, and control the frequency synthesizers 216, 218 to both generate the clock signals CLK1, CLK2 corresponding to the 5 GHz band or the 6 GHz band to the transceiver circuits 212, 214. As mentioned above, for a station that needs to use the 5 GHz band and perform 2T2R, 2T2R may be performed in the time slots (t1-t2), (t3-t4), and 2T2R may be guaranteed to be performed in the time slot (t2-t3). In the same way, for a station that needs to use the 6 GHz band and perform 2T2R, 2T2R may be performed in the time slots (t1-t2), (t3-t4) and 2T2R may be guaranteed to be performed in the time slot (t4-t5).

In addition, in the embodiment of FIG. 7, it is assumed that the wireless communication chip 130 is using the 5 GHz band to communicate with a first station and using the 6 GHz band to communicate with a second station. The wireless communication chip 130 may use a single antenna to transmit data to the first station and may use a single antenna to transmit data to the second station in the time slots (t1-t2), (t3-t4), use two antennas to transmit a large amount of data to the first station in the time slot (t2-t3), and use two antennas to transmit a large amount of data to the second station in the time slot (t4-t5). As a result, the data transmission time may be greatly shortened.

In another embodiment, if the wireless communication chip 130 finds that it is no need to use the 5 GHz band for communication at the time t2, the DBCC function may be enabled at the time t2, and 1T1R may be used to communicate with other stations in the next time slot (t2-t3).

Figure 8:
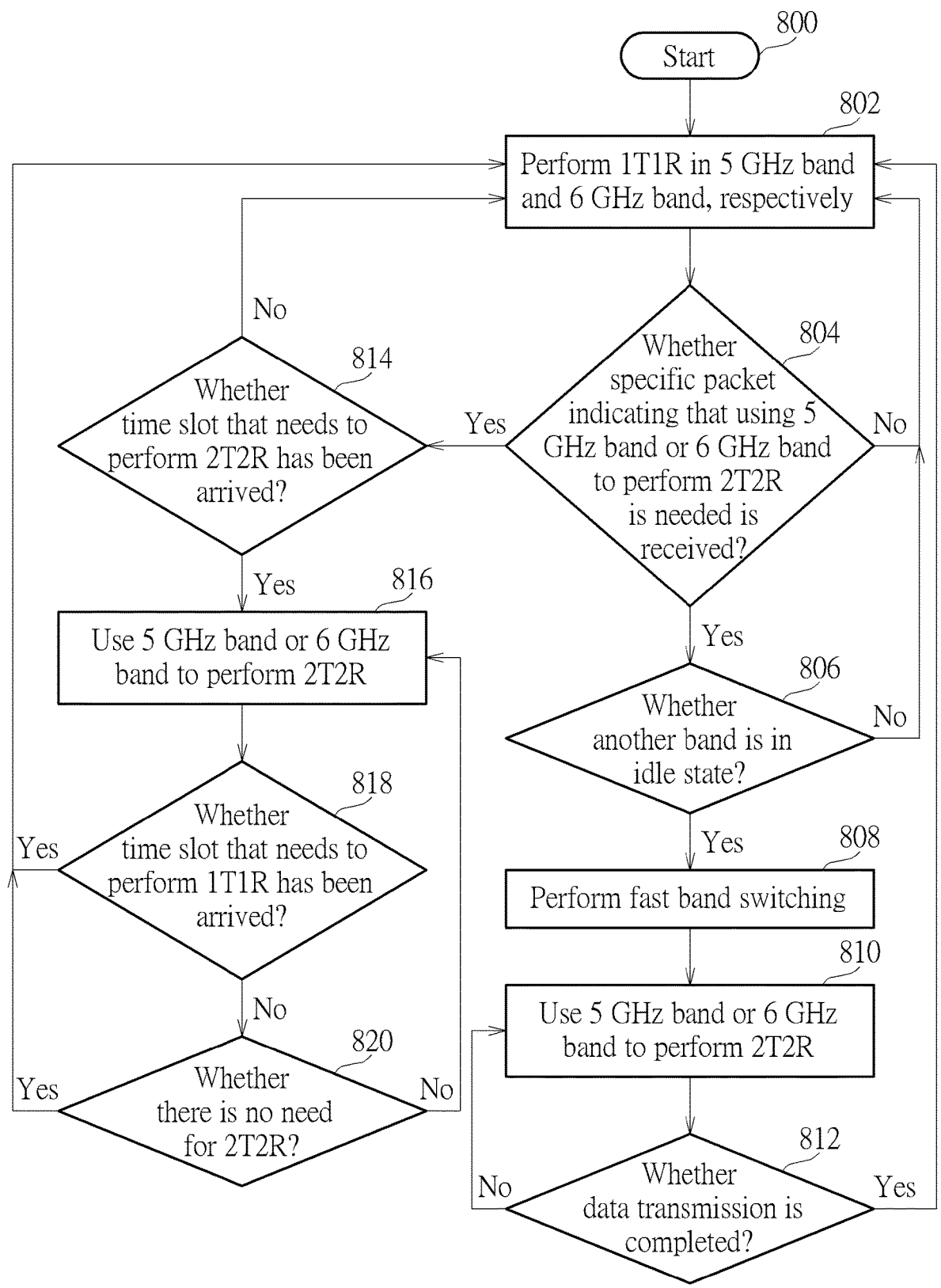
FIG. 8 is a flow chart of a wireless communication chip according an embodiment of the present invention.

FIG. 8 is a flow chart of operations of the wireless communication chip 130 according to an embodiment of the present invention. Referring to the contents provided in the embodiments of FIGS. 1, 7, and 8, the operation flow is as follows.

Step 800: The flow starts.

Step 802: The wireless communication chip perform 1T1R in the 5 GHz band and the 6 GHz band, respectively.

Step 804: It is determined that whether a specific packet is received, wherein the specific packet indicates that using the 5 GHz band or the 6 GHz band to perform 2T2R is needed. If yes, Step 806 and Step 814 is entered; if no, Step 802 is returned.

Step 806: It is determined that whether another band that does not need to perform 2T2R is in the idle state. If yes, Step 808 is entered; if no, Step 802 is returned.

Step 808: The fast band switching is performed.

Step 810: The 5 GHz band or the 6 GHz band is used to perform 2T2R.

Step 812: It is determined that whether the data transmission of performing 2T2R is completed. If yes, Step 802 is returned; if no, Step 810 is returned.

Step 814: It is determined that whether the time slot that needs to perform 2T2R has been arrived. If yes, Step 816 is entered; if no, Step 802 is returned.

Step 816: The 5 GHz band or the 6 GHz band is used to perform 2T2R.

Step 818: It is determined that whether the time slot that needs to perform 1T1R has been arrived. If yes, Step 802 is returned; if no, Step 820 is entered.

Step 820: It is determined that whether there is no need for 2T2R. If yes, Step 802 is returned; if no, Step 816 is returned.

Figure 9:
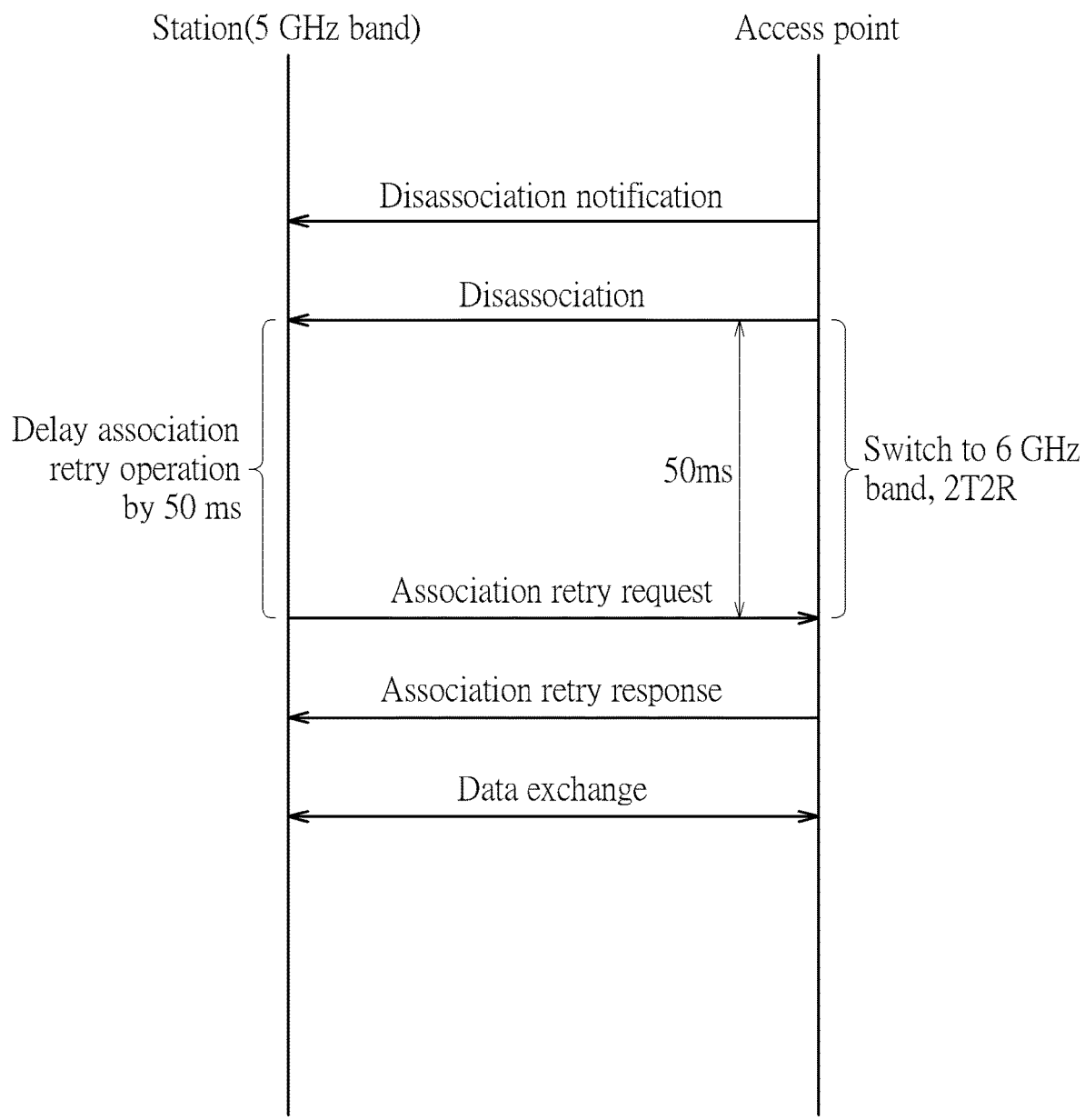
FIG. 9 is a timing diagram of operations of a station when an access point switches a band.

In the above embodiments, since the band switching is involved, some stations will suffer from disconnection. Take the band switching at time t4 shown in FIG. 7 as an example. Since the wireless communication chip 130 switches to the 6 GHz band to perform 2T2R, the wireless communication chip 130 needs to notify the station using the 5 GHz band to perform related operations. Specifically, please refer to FIG. 9, which is a timing diagram of interactions between a station using the 5 GHz band and an access point using the chipset 100. For the convenience of description, the sequence diagram in FIG. 9 is described with time points near the times t4 and t5 in FIG. 7. First, it is assumed that the wireless communication chip 130 is originally using 1T1R or 2T2R to communicate with a station (a station using the 5 GHz band). If the wireless communication chip 130 determines that it is about to switch to the 6 GHz band to perform 2T2R with other stations, the wireless communication chip 130 may first send a disassociation notification to the station, to notify that after a certain period of time (e.g. 1 ms), the disconnection will happen. Then, after a period of time, the wireless communication chip 130 actively interrupts the connection with the station and switches to the 6 GHz band to perform 2T2R with other stations. After receiving the disassociation notification from the access point, the station will delay the original association retry operation by 50 ms. That is, in the next 50 ms, the association retry operation will not be initiated to try to perform association with the access point, and the station may enter the power saving mode at this moment. Then, after 50 ms, the station sends an association retry request to the access point, and the wireless communication chip 130 in the access point will send an association retry response to the station. At this moment, the station may use 1T1R or 2T2R again to communicate with the wireless communication chip 130 for data exchange. It should be noted that, the embodiment of FIG. 9 takes the station using the 5 GHz band as an example for illustrative purposes, and those with general knowledge of the present invention should be able to understand how to apply the above content to a station using the 6 GHz band.

In summary, in the wireless communication chip of the present invention, by using the TDMA to achieve 2T2R of the 5 GHz band or the 6 GHz band or using the fast band switching to provide 2T2R of the 5 GHz band or the 6 GHz band when needed, the 2T2R function of multiple bands may be effectively achieved under the situation of using a single wireless communication chip, which effectively reduces the manufacturing and design costs of the chipset.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication chip, comprising:
   an analog front-end circuit, comprising:
      a first transceiver circuit, coupled to a first antenna, and arranged to transmit or receive signals through the first antenna; and
      a second transceiver circuit, coupled to a second antenna, and arranged to transmit or receive signals through the second antenna; and
   a baseband circuit, arranged to control the first transceiver circuit to use a first band or a second band for communication, and/or control the second transceiver circuit to use the first band or the second band for communication;
   wherein the baseband circuit controls the first transceiver circuit and the second transceiver circuit so that the analog front-end circuit alternately performs two transmit and two receive paths (2T2R) in the first band and 2T2R in the second band through both of the first antenna and the second antenna;
   wherein time division multiple access (TDMA) is utilized to achieve the 2T2R in the first band and the 2T2R in the second band;
   wherein a time length of each time slot in the wireless communication chip is half of a transmission interval of a beacon in the first band, and the time length of said each time slot in the wireless communication chip is half of a transmission interval of another beacon in the second band.

2. The wireless communication chip of claim 1, wherein the first band is a 5 gigahertz (GHz) band, and the second band is a 6 GHz band.

3. The wireless communication chip of claim 1, wherein in a first time slot, the baseband circuit controls the first transceiver circuit and the second transceiver circuit so that the first transceiver circuit and the second transceiver circuit transmit or receive signals in the first band, and the first transceiver circuit and the second transceiver circuit are not able to transmit or receive signals in the second band at this moment; and in a second time slot next to the first time slot, the baseband circuit controls the first transceiver circuit and the second transceiver circuit so that the first transceiver circuit and the second transceiver circuit transmit or receive signals in the second band, and the first transceiver circuit and the second transceiver circuit are not able to transmit or receive signals in the first band.

4. The wireless communication chip of claim 3, wherein the analog front-end circuit further comprises:
   at least one frequency synthesizer, arranged to generate a clock signal with a frequency in the first band to the first transceiver circuit and the second transceiver circuit in the first time slot, and generate the clock signal with a frequency in the second band to the first transceiver circuit and the second transceiver circuit in the second time slot.

5. The wireless communication chip of claim 3, wherein in the first time slot, the first transceiver circuit and the second transceiver circuit transmit the beacon in the first band; and in the second time slot, the first transceiver circuit and the second transceiver circuit transmit said another beacon in the second band.

6. The wireless communication chip of claim 1, wherein the wireless communication chip is disposed in an access point or a router.

7. A wireless communication chip, comprising:
an analog front-end circuit, comprising:
  a first transceiver circuit, arranged to transmit or receive signals through a first antenna; and
  a second transceiver circuit, arranged to transmit or receive signals through a second antenna; and
a baseband circuit, arranged to control the first transceiver circuit to use a first band or a second band for communication, and/or control the second transceiver circuit to use the first band or the second band for communication;
wherein the baseband circuit controls the first transceiver circuit and the second transceiver circuit so that the first transceiver circuit uses one transmit and one receive path (1T1R) in the first band through the first antenna, and the second transceiver circuit uses 1T1R in the second band through the second antenna; and when the analog front-end circuit and the baseband circuit receive a specific packet that indicates a two transmit and two receive paths (2T2R) requirement, the baseband circuit controls the first transceiver circuit and the second transceiver circuit so that the first transceiver circuit and the second transceiver circuit use 2T2R in the first band or the second band through both of the first antenna and the second antenna;
wherein a combination of time division multiple access (TDMA) and band switching is utilized to achieve the 2T2R in the first band and the 2T2R in the second bands;
wherein a time length of each time slot in the wireless communication chip is half of a transmission interval of a beacon in the first band, and the time length of said each time slot in the wireless communication chip is half of a transmission interval of another beacon in the second band.

8. The wireless communication chip of claim 7, wherein the first band is a 5 gigahertz (GHz) band, and the second band is a 6 GHz band.

9. The wireless communication chip of claim 7, wherein under a default state of the wireless communication chip, the baseband circuit controls the first transceiver circuit and the second transceiver circuit so that the first transceiver circuit uses 1T1R in the first band, and the second transceiver circuit uses 1T1R in the second band.

10. The wireless communication chip of claim 7, wherein in a first time slot, the baseband circuit controls the first transceiver circuit and the second transceiver circuit so that the first transceiver circuit transmits or receives signals in the first band, and the second transceiver circuit transmits or receives signals in the second band; in a second time slot next to the first time slot, the baseband circuit controls the first transceiver circuit and the second transceiver circuit so that the first transceiver circuit and the second transceiver circuit transmit or receive signals in the first band, and the first transceiver circuit and the second transceiver circuit are not able to transmit or receive signals in the second band at this moment; in a third time slot next to the second time slot, the baseband circuit controls the first transceiver circuit and the second transceiver circuit so that the first transceiver circuit transmits or receives signals in the first band, and the second transceiver circuit transmits or receives signals in the second band; and in a fourth time slot next to the third time slot, the baseband circuit controls the first transceiver circuit and the second transceiver circuit so that the first transceiver circuit and the second transceiver circuit transmit or receive signals in the second band, and the first transceiver circuit and the second transceiver circuit are not able to transmit or receive signals in the first band at this moment.

11. The wireless communication chip of claim 10, wherein the analog front-end circuit further comprises:
  a first frequency synthesizer, arranged to generate a first clock signal to the first transceiver circuit; and
  a second frequency synthesizer, arranged to generate a second clock signal to the second transceiver circuit;
  wherein in the first time slot and the third time slot, the first frequency synthesizer generates the first clock signal with a frequency in the first band to the first transceiver circuit, and the second frequency synthesizer generates the second clock signal with a frequency in the second band to the second transceiver circuit; in the second time slot, the first frequency synthesizer generates the first clock signal with a frequency in the first band to the first transceiver circuit, and the second frequency synthesizer generates the second clock signal with a frequency in the first band to the second transceiver circuit; and in the fourth time slot, the first frequency synthesizer generates the first clock signal with a frequency in the second band to the first transceiver circuit, and the second frequency synthesizer circuit generates the second clock signal with a frequency in the second band to the second transceiver circuit.

12. The wireless communication chip of claim 7, wherein the wireless communication chip is disposed in an access point or a router.

* * * * *